(12) United States Patent
Balslev et al.

(10) Patent No.: US 10,324,522 B2
(45) Date of Patent: Jun. 18, 2019

(54) METHODS AND SYSTEMS OF A MOTION-CAPTURE BODY SUIT WITH WEARABLE BODY-POSITION SENSORS

(71) Applicants: Jakob Balslev, Sausilito, CA (US); Anders Kullmann Klok, Copenhagen (DK); Maziar Taghiyar-Zamani, Odense (DK); Matias Søndergaard, Copenhagen (DK)

(72) Inventors: Jakob Balslev, Sausilito, CA (US); Anders Kullmann Klok, Copenhagen (DK); Maziar Taghiyar-Zamani, Odense (DK); Matias Søndergaard, Copenhagen (DK)

( * ) Notice: Subject to any disclaimer, the term of this patent is extended or adjusted under 35 U.S.C. 154(b) by 0 days.

(21) Appl. No.: 15/361,347

(22) Filed: Nov. 25, 2016

(65) Prior Publication Data

US 2017/0192496 A1  Jul. 6, 2017

Related U.S. Application Data

(60) Provisional application No. 62/260,248, filed on Nov. 25, 2015.

(51) Int. Cl.
*G06F 3/01* (2006.01)
*G06T 13/40* (2011.01)
(Continued)

(52) U.S. Cl.
CPC ............ *G06F 3/011* (2013.01); *A63F 13/211* (2014.09); *A63F 13/212* (2014.09);
(Continued)

(58) Field of Classification Search
CPC ........ G06F 3/011; G06F 3/017; A63F 13/211; A63F 13/212; A63F 13/428; A63F 2300/1043; A63F 2300/105; A63F 2300/8082; G06T 13/40
See application file for complete search history.

(56) References Cited

U.S. PATENT DOCUMENTS

| | | | |
|---|---|---|---|
| 7,602,301 B1* | 10/2009 | Stirling | A61B 5/1127 340/573.1 |
| 9,767,574 B2* | 9/2017 | Menozzi | G06T 7/33 |

(Continued)

*Primary Examiner* — Tom Sheng

(57) ABSTRACT

In one aspect, a method of a motion-capture body suit include the step of providing a motion-capture body suit, wherein the motion-capture body suit comprises a plurality of position sensors, wherein each position sensor of the plurality of position sensors obtains a position of an associated body area, wherein each position sensor is integrated into a textile tunnel located on the associated body are of each position sensor. The method includes the step of obtaining a set of sensor-level position data from the plurality of position sensors as a series of position measurements observed over a specified period of time. The method includes the step of obtaining a body-level position data as another series of body-position measurements observed over the specified period of time. The method includes the step of combining the set of sensor-level position data and the body-level position data using a Kalman filter to produce a body-motion output stream. The method includes the step of rendering an image data of a virtual representation of a user wearing the motion-capture suit.

8 Claims, 12 Drawing Sheets

(51) Int. Cl.
    *A63F 13/211*     (2014.01)
    *A63F 13/212*     (2014.01)
    *A63F 13/428*     (2014.01)
    *G06T 7/20*     (2017.01)
    *A63F 13/25*     (2014.01)
    *A63F 13/213*     (2014.01)
    *A63F 13/5255*     (2014.01)

(52) U.S. Cl.
    CPC ............ *A63F 13/213* (2014.09); *A63F 13/25* (2014.09); *A63F 13/428* (2014.09); *A63F 13/5255* (2014.09); *G06F 3/017* (2013.01); *G06T 7/20* (2013.01); *G06T 13/40* (2013.01)

(56) References Cited

U.S. PATENT DOCUMENTS

| | | | |
|---|---|---|---|
| 2008/0285805 A1* | 11/2008 | Luinge | A61B 5/1114 382/107 |
| 2009/0278791 A1* | 11/2009 | Slycke | A61B 5/103 345/156 |
| 2014/0035071 A1* | 2/2014 | Chen | H01L 29/84 257/415 |
| 2015/0032408 A1* | 1/2015 | Grenet | G06F 3/011 702/141 |
| 2016/0015299 A1* | 1/2016 | Chan | A61B 5/1116 600/595 |
| 2016/0292497 A1* | 10/2016 | Kehtarnavaz | H04N 5/232 |
| 2017/0000388 A1* | 1/2017 | Jessen | A61B 5/112 |
| 2017/0147872 A1* | 5/2017 | Maroy | G06K 9/00342 |

\* cited by examiner

METHODS AND SYSTEMS OF A MOTION-CAPTURE BODY SUIT WITH WEARABLE BODY-POSITION SENSORS

CROSS-REFERENCE TO RELATED APPLICATIONS

This application is a claims priority from U.S. Provisional Patent Application No. 62/260,248, filed on 25 Nov. 2015. This application is a claims priority from U.S. Provisional Patent Application No. 62/426,434, filed on 25 Nov. 2016. These applications are hereby incorporated by reference in their entirety.

FIELD OF THE INVENTION

The invention is in the field of motion sensing and analysis and more specifically to a method, system and apparatus of a motion-capture body suit with wearable body-position sensors.

BRIEF SUMMARY OF THE INVENTION

In one aspect, a method of a motion-capture body suit include the step of providing a motion-capture body suit, wherein the motion-capture body suit comprises a plurality of position sensors, wherein each position sensor of the plurality of position sensors obtains a position of an associated body area, wherein each position sensor is integrated into a textile tunnel located on the associated body are of each position sensor. The method includes the step of obtaining a set of sensor-level position data from the plurality of position sensors as a series of position measurements observed over a specified period of time. The method includes the step of obtaining a body-level position data as another series of body-position measurements observed over the specified period of time. The method includes the step of combining the set of sensor-level position data and the body-level position data using a Kalman filter to produce a body-motion output stream. The method includes the step of rendering an image data of a virtual representation of a user wearing the motion-capture suit from the body-motion output stream.

Optionally, the position information can include a velocity value, an acceleration value, and an orientation value of the associated body area. The Kalman filter can include a double Kalman filter that implements a Bayesian inference process and estimates a joint probability distribution over the set of sensor-level position data and the body-level position data for each timeframe measured in the specified period of time. Each position sensor of the plurality of position sensors comprises an inertial motion units (IMU) sensor. The IMU sensor can have nine degrees of freedom (DoF). The motion-capture body suit can automatically repositions suit elements embedded in a textile tunnel to a correct position using the textile tunnel's shape and tensile resistance of the textile.

Figure 1A:
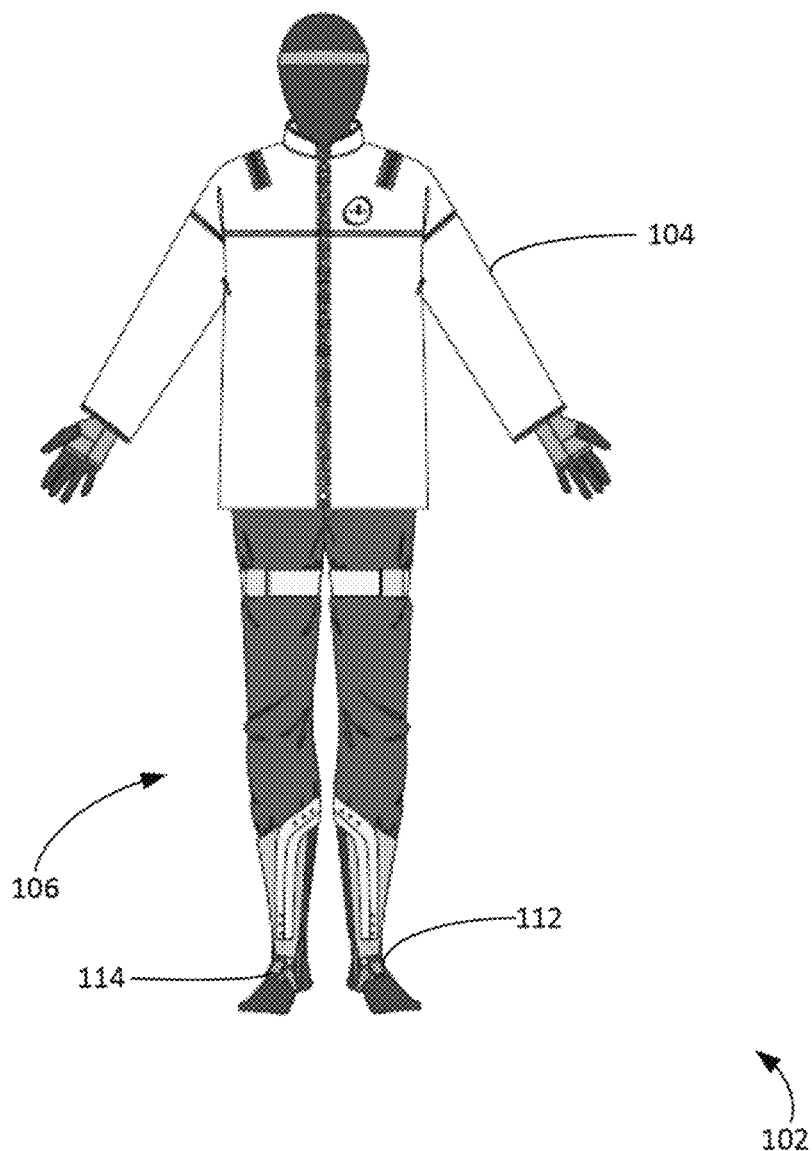
FIGS. 1 A-B illustrates an example of a motion-capture body suit with jacket with extendable foot and leg option(s), according to some embodiments.

The Figures described above are a representative set, and are not an exhaustive with respect to embodying the invention.

DESCRIPTION

Disclosed are a system, method, and article of a motion-capture body suit with wearable body-position sensors. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Animatics can be a series of still images edited together and/or displayed in sequence with rough dialogue (e.g. scratch vocals) and/or rough soundtrack added to the sequence of still images to test said sound and/or images.

Augmented reality (AR) can be a live direct or indirect view of a physical, real-world environment whose elements are augmented (and/or supplemented) by computer-generated sensory input such as: sound, video, graphics and/or GPS data.

Body-position sensor can be any sensor that provides information used to determine the position of a specified location on a body based on, inter alia: position sensor systems (e.g. miniature inertial sensors, accelerometers, etc.), biomechanical models and/or sensor-fusion algorithms.

Cloud computing can involve deploying groups of remote servers and/or software networks that allow centralized data storage and online access to computer services or resources. These groups of remote serves and/or software networks can be a collection of remote computing services.

Haptic technology (e.g. kinesthetic communication) can apply forces, vibrations and/or motions to the user. This mechanical stimulation can create the perception of virtual objects by a user. Haptic devices may incorporate tactile sensors that measure forces exerted by the user on the interface.

Mobile device can be a smart phone, tablet computer, wearable computer (e.g. a smart watch, a head-mounted display computing system, etc.). In one example, a mobile device can be a small computing device, typically small enough to be handheld having a display screen with touch input and/or a miniature keyboard.

Motion capture can include the process of recording the movement of people, animals, vehicles, etc.

Previs (i.e. previsualization) can be a function to visualize complex scenes in a movie before filming and/or in an animation project before the final production.

Real-time rendering can include various interactive areas of computer graphics that create synthetic images fast enough with a computer such that a viewer can interact with a virtual environment. The most common place to find real-time rendering is in video games.

Visual effects (VFX) are the processes by which imagery can be created and/or manipulated outside the context of a live action shot. Visual effects can include the integration of live-action footage and generated imagery to create environments depicted in film, VR, AR, other virtual environments, etc.

Virtual Reality (VR) can include an immersive multimedia and/or computer-simulated life, replicates an environment that simulates physical presence in places in a world simulation and lets the user interact in that world. Virtual reality can also include creating sensory experiences, which can include, inter alia: sight, hearing, touch, and/or smell.

Exemplary Systems

A motion-capture body suit can be implemented with wearable body-position sensors. The motion capture suit can be worn over various parts of a body. For example, the motion-capture suite can be a full-body suit. The body-position sensors can be placed in various locations of the motion-capture suit. Each body-position sensors can provide information used to determine the position of a specified location on a body (e.g. a hand, an elbow, a head, a leg, a finger, a torso, a paw, a wing, etc.). The positions of multiple body locations can be obtained in a time sequence. The body-position sensors (e.g. sensor nodes) can communicatively-coupled with one or more hub computer units (e.g. mobile devices, etc.). The body-position sensors can provide positional information to the one or more hub computer units on a periodic basis. The computing units can wirelessly communicate this information to another computer system (e.g. a server, a cloud-computing application, etc.). Body-position information can then be rendered in real-time (e.g. assuming processing latency, networking latency, etc.) for integration body-position information to animate digital character models in computer animation and other visual application (e.g. computer gaming, VR, AR, film, VFX, cartoons, military applications, sports, physical therapy, etc.).

In one example, a user's body position information can be integrated into an avatar (e.g. a 'live' cartoon character, etc.). The avatar can be displayed in a currently-shown animated story using real-time rendering.

In another example, a full body-VR game can be provided. The user can utilize the motion-capture body suit (or a motion-capture partial suit) to embody a monster and rampage through a city that are part of the VR game. The user can use the motion-capture body suit and VR goggles to play the game. Other users can wear respective motion-capture body suits. Accordingly, the body motion of more than one user can integrated into each user's avatar in the VR game.

Users can also build their own content for VR games. Various user interfaces can be provided to receive user selections, input and the like that can be used to create the VR-game content. In yet another example, motion-capture body suit information can be utilized in the creative process for testing characters, scenes, making animatics, previs, etc. In one example, motion-capture body suit information can be used sport, physical therapy and/or medical diagnosis/analysis. For example, athletes can wear the motion-capture body suit to record and improve various motions such as golf swings, tennis serves, etc. The motion-capture body suit information can be integrated into an avatar display to provide feedback such that the athlete can adjust his/her movements. In other examples, athlete motion can be compared with various guidelines, styles and/or professionals via animation of the user's motions and the compared motion.

It is noted that, in some examples, the motion-capture body suit can cover only a specified portion of a body (e.g. a glove, a legging, a torso wrap, a helmet, a face-mask, a collar, etc.). Furthermore, the motion-capture body suit can provide the mobility of street wear. The motion-capture body suit can be worn in various locations (e.g. a stage, a home living room, an office, a class room, etc.). The motion-capture body suit can be integrated with third-party applications. Accordingly, various application programming interfaces (APIs) can be provided and/or accessed to enable communication of body-sensor position information to the third-party applications and/or receive instructions therefrom.

In one example motion-capture body suit system can include a plurality of inertial motion units (IMU) sensors. IMU sensors can be located on the limbs of the motion-capture body suit system. In some embodiments, an IMU can have nine degrees of freedom (DoF). Wires and electronics can located behind zipper(s). The motion-capture body suit can include a master controller. The master controller can communicate with sensors and transmitting the data wirelessly. In one example, an external USB power source can be used for the master controller. Stretch fabric similar to sports clothes. Sensors can be located in hand/fingers portion of the motion-capture body suit. Detachable wires can connect the sensors together for power and data transmission from master controller. Sensor electronics can be encapsulated in a protective casing. The motion-capture body suit can transmit live motion-capture data directly to a computer that renders an animated character.

Figure 1B:
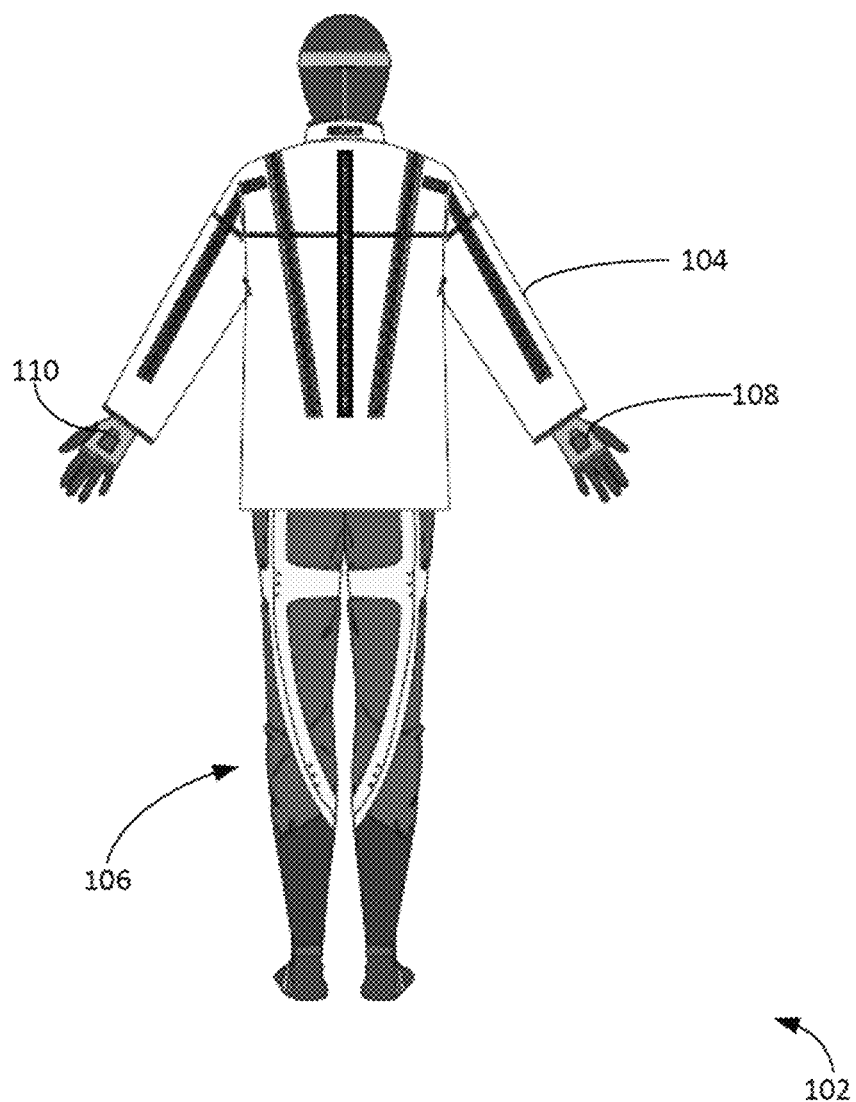

FIGS. 1 A-B illustrates an example of a motion-capture body suit 102 with jacket 104 with extendable foot and leg option(s) 106, according to some embodiments. More specifically, FIG. 1A illustrates an example front view of motion-capture body suite 102. FIG. 1B illustrates an example rear view of motion-capture body suit 102. Motion-capture body suit 102 can include a jacket element 104. Motion-capture body suit 102 can an extendable foot/leg element 106. Motion-capture body suit 102 can be a 'smart suit' is aware of its own parts/joints. Motion-capture body suit 102 can include a computing system with embedded software that receives various positional/orientation/motion/inertial information from position sensors on the suit (e.g. position sensors 108-114, etc.). Motion-capture body suit 102 can include an architecture of connectivity between said position sensors. This architecture can be based on a human body model that is configured to represent the exact position of each positional sensor node without the necessity of individual configuration. A user can replace various elements of motion-capture body suit 102 (e.g. a positional sensor). The computing system of motion-capture body suit 102 can then automatically recognize where the new positional sensor node is located in the system architecture of motion-capture body suit 102. Motion-capture body suit 102 be configured to allow a user to hot-swap positional sensor without the need to turn off the system before replacing/extending the elements of its architecture.

Motion-capture body suit 102 can be a lightweight system based on inertial sensors seamless embedded in various specific places on the body in a full body textile suit. The users of the system can set up the motion-capture body suit 102 by putting on the suit within minutes. Motion-capture body suit 102 can resembles 'regular' sportswear and be intuitive to use. Motion-capture body suit 102 can be a textile suit. Positional sensors can be placed in textile compartments that maintain the positional sensor and other components in place. Motion-capture body suit 102 can use a replaceable power source integrated into its design.

The textile design motion-capture body suit 102 can automatically repositioning suit elements. For example, positional sensors can be embedded in a textile tunnel. Accordingly, a positional sensor can automatically fall back into place over time, if a movement or jolt should push the positional sensor out of position. The textile tunnels can be configured to enable a user to mount/demount and replace parts. The textile and design make it extremely easy to mount and demount the electronic components from the suit when washing the suit. The user can have direct access to all electronic components via the textile tunnels that are accessed via zippers and/or other fastening systems. The positional sensors and other component infrastructure (e.g. cables for electronic communication and power provision) can be embedded in the textile portion of motion-capture body suit 102. In this way, position sensors and other component are not exposed and therefore provided some protection from damage. This can enable physical interaction between two players/actors. Motion-capture body suit 102 can touch and/or otherwise interaction with real, physical objects without affecting the position of the sensors. For example, two actors wearing motion-capture body suits can embrace each other in a scene without repositioning or damaging sensors in their respective motion-capture body suits.

A lining can be attached in the jacket 104. For example, it can be attached along the center front zip, neckline, hem facing line and bottom sleeve facing line and with walls from lining to outer jacket, etc. This placement can create tunnels for the wires that connect position sensors. Data from position sensors 108-114 can obtain time-sequenced position/motion/inertial/orientation information for a head/body area associated with each respective sensor. This information can be used for determining a similar time-sequenced position/motion/inertial/orientation of a hand/digit area of virtual-reality avatar. This information can be used for body-gesture recognition.

Figure 2A:
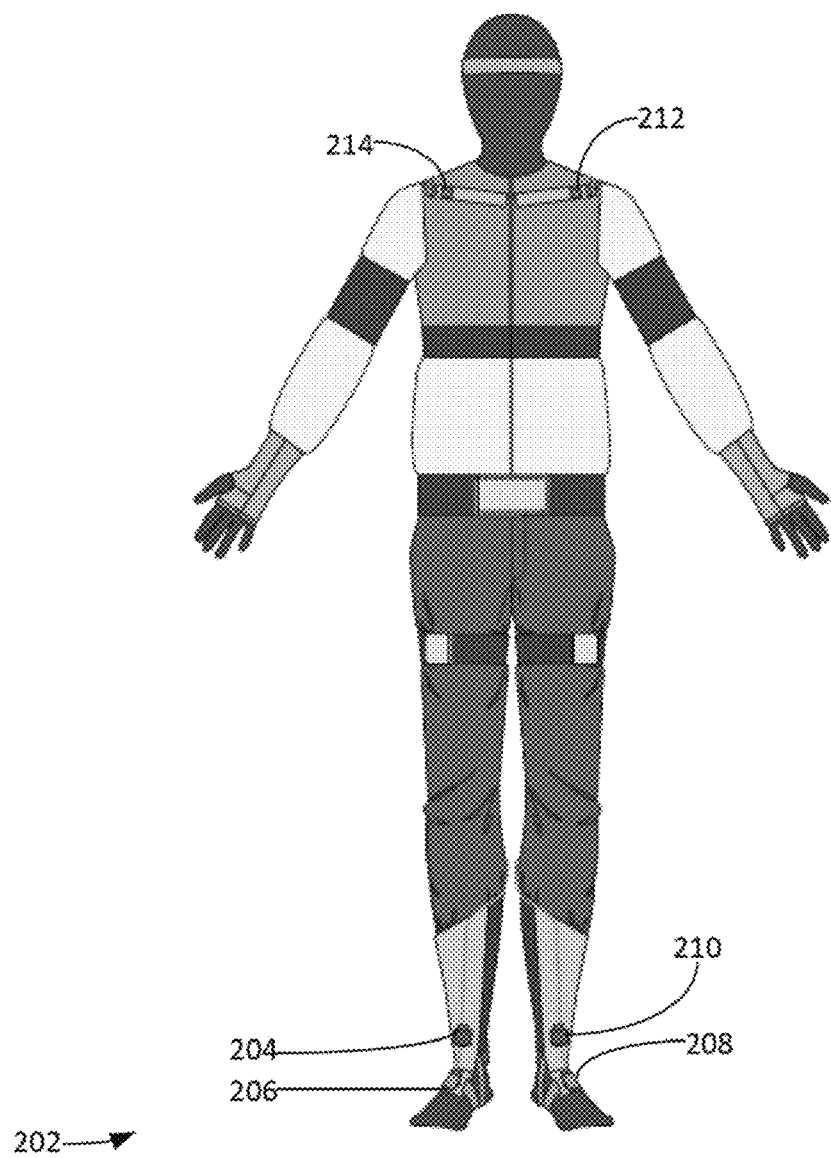
FIGS. 2 A-B illustrates a base-layer of a motion-capture body suit, according to some embodiments.
Figure 2B:
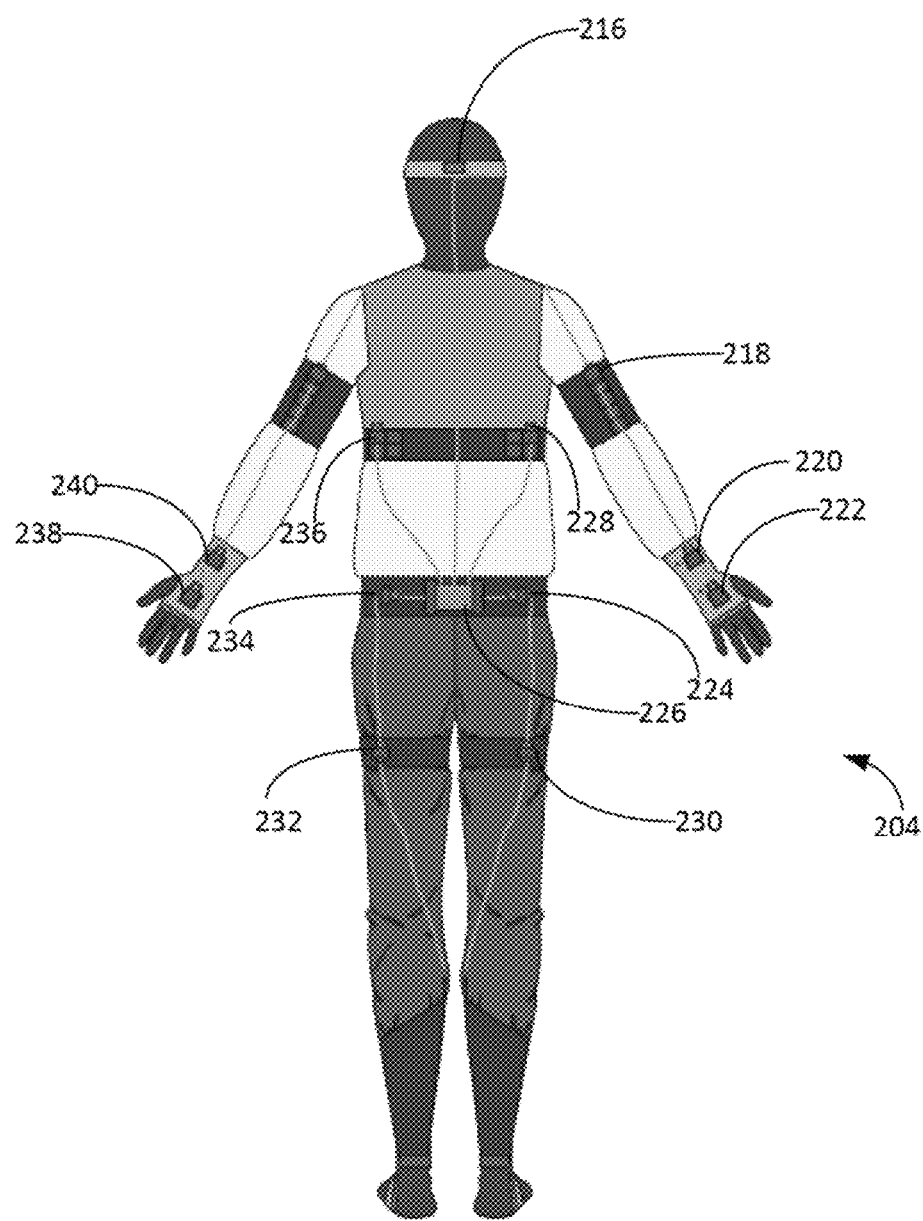

In some examples, motion-capture body suit 102 can include multiple layers. Accordingly, FIGS. 2 A-B illustrates a base-layer of a motion-capture body suit 202, according to some embodiments. More specifically, FIG. 2A illustrates an example front-view of the base-layer of motion-capture body suit 202. FIG. 2B illustrates an example rear-view of the base-layer of motion-capture body suit 202. Motion-capture body suit 202 can Motion-capture body suit 202 can include position sensors 204-240. Position sensors 204-240 can be placed at specific locations in motion-capture body suit 202 with respect to a user's limbs, core, digits, head, etc. Motion-capture body suit 202 can include a lining with sensor placement, according to some embodiments. As with motion-capture body suit 102, the lining of motion-capture body suit 202 can be attached in an outer jacket or other out layer. For example, it can be attached along the center front zip, neckline, hem facing line and bottom sleeve facing line and with walls from lining to outer jacket, etc. This placement can create tunnels for wires and the like. Data from position sensors 204-240 can obtain time-sequenced position/motion/inertial/orientation information for a body area associated with each respective sensor. This information can be used for determining a time-sequenced position/motion/inertial/orientation of a body area of virtual-reality avatar. This information can be used for body-gesture recognition. In some embodiments, motion-capture body suit 202 can include additional sensors (e.g. biosensors, light sensors, microphones, digital cameras, etc.).

Accordingly, motion-capture body suit 202 can provide position/motion/inertial/orientation from position sensors 204-220 (as well as other position sensors not shown) to a computing system for analysis. In this way, motion-capture body suit 202 can be a part of a smart-interactive system between the hardware elements (e.g. sensors and hub), the user's body motions, and a software/firmware system (e.g. interactive system 800 of FIG. 8 infra).

Figure 3:
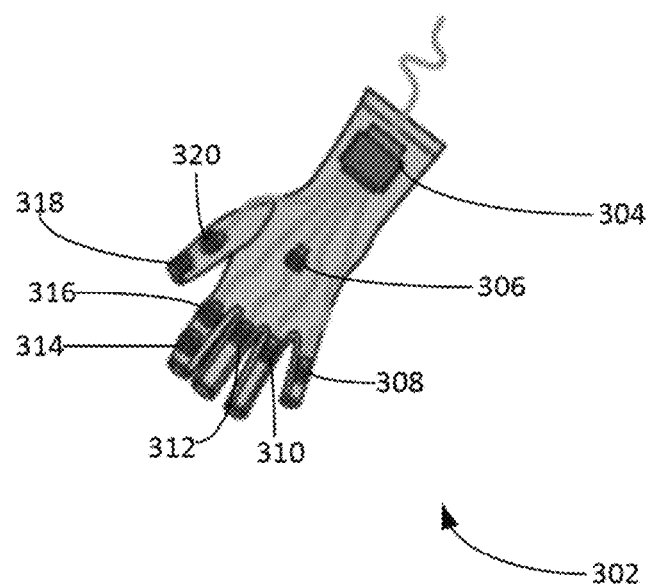
FIG. 3 illustrates an example motion-capture glove, according to some embodiments.

FIG. 3 illustrates an example motion-capture glove 302, according to some embodiments. Motion-capture glove can be integrated into a body-motion capture system (e.g. motion-capture body suit 102, motion-capture body suit 202, etc.). Motion-capture glove 302 can integrate position sensors 304-320 in the same type of lining and manner as motion-capture body suit 102 and/or motion-capture body suit 202 discussed supra. Data from position sensors 304-320 can obtain time-sequenced position/motion/inertial/orientation information for a hand/digit area associated with each respective sensor. This information can be used for gesture recognition. This information can be used for determining a similar time-sequenced position/motion/inertial/orientation of a hand/digit area of virtual-reality avatar.

Figure 4:
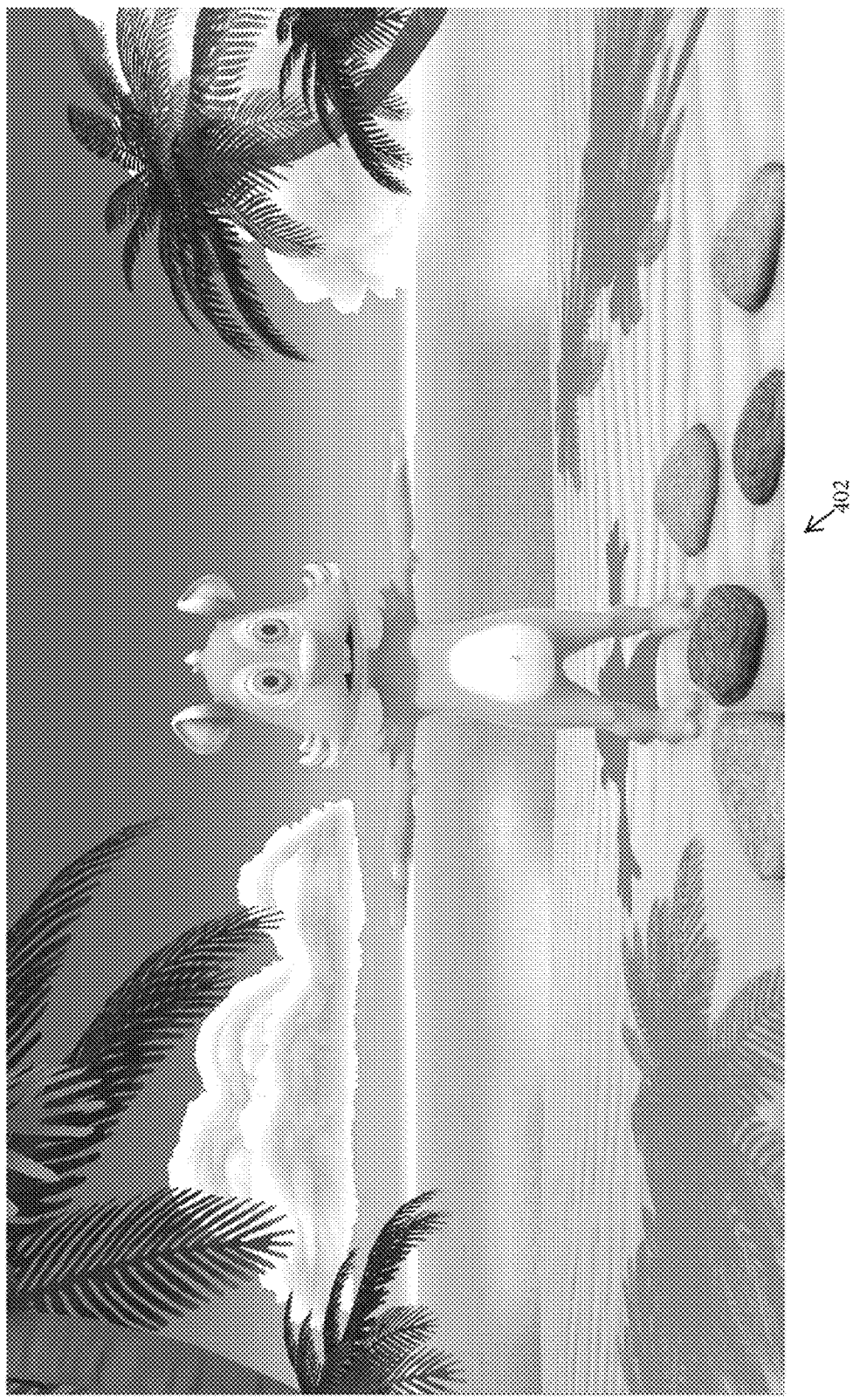
FIG. 4 illustrates an example image of an avatar in a virtual environment, according to some embodiments.

FIG. 4 illustrates an example image of an avatar 402 in a virtual environment, according to some embodiments. Body-position information obtained from a motion-capture body suit can be used to control corresponding motions of the avatar in real time. For example, a user wearing a motion-capture body suit can raise her right arm. The right arm of the avatar can then be automatically raised in the digital image. The user can walk across a room. The avatar can then automatically walk across a portion of the virtual environment. Avatar motions can be augmented beyond the motion of the user in the motion-capture body suit. For example, a user can make a jumping motion of a few inches. The avatar can jump over a virtual building or other height that is greater than that of the user.

Figure 5:
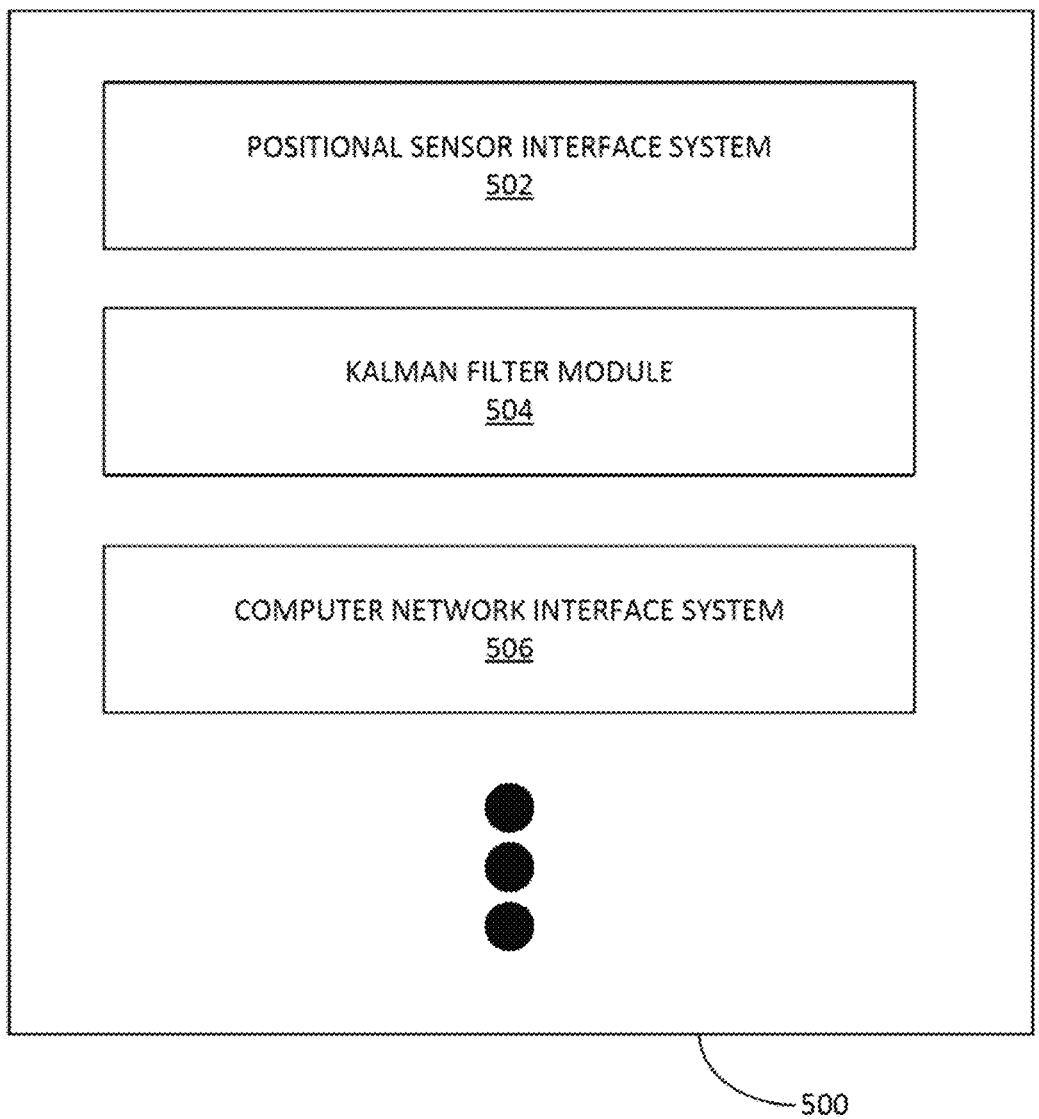
FIG. 5 illustrates an example computer system integrated into a motion-capture body suit, according to some embodiments.

FIG. 5 illustrates an example computer system 500 integrated into a motion-capture body suit, according to some embodiments. Computer system 500 can include a position-sensor interface system 504, position sensor interface system 504 can receive incoming data from various position sensors. Position sensor interface system 504 can send data to position sensors and/or other elements of the motion-capture boy suit (e.g. haptic systems, diagnostic systems, etc.), computing network interface, etc. Position sensor interface system 504 can provide position sensor data to Kalman filtering module 506. Kalman filtering module 506 implement Kalman filtering (e.g. linear quadratic estimation (LQE)). Kalman filtering module 506 implement can use a series of measurements observed over time, containing statistical noise and other inaccuracies, and produces estimates of unknown variables that tend to be more precise than those based on a single measurement alone, by using Bayesian inference and estimating a joint probability distribution over the variables for each timeframe. Kalman filtering module 506 implement process 1000 of FIG. 10 infro. The output of systems 502 and/or 504 can be communicated to various computer networks (e.g. the Internet), external servers, mobile device, etc. using computer network interface system 506, computer network interface system 506 can also receive instructions from external computing systems Motion-capture body suit motion/position/inertia/orientation information (i.e. 'position' information) can be obtained two levels. Computer system 500 can include a replaceable power source, local memory systems, antennae, user-input systems, computer processors, touchscreen, speakers, etc.

Figure 6:
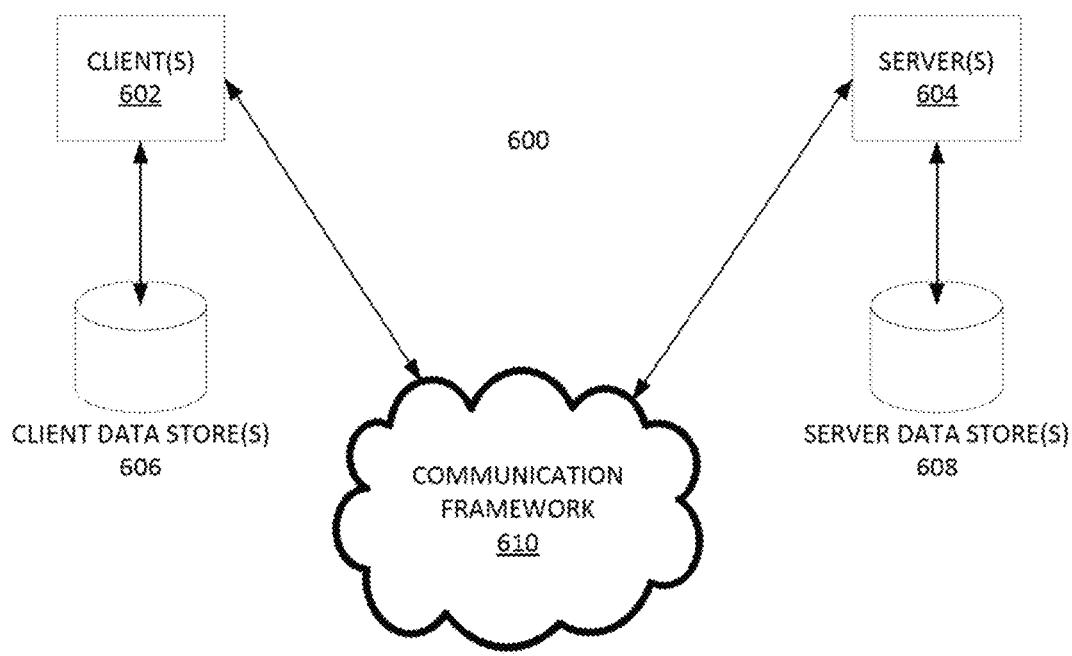
FIG. 6 depicts an exemplary computing system that can be configured to perform any one of the processes provided herein.

FIG. 6 is a block diagram of a sample-computing environment 600 that can be utilized to implement various embodiments. The system 600 further illustrates a system that includes one or more client(s) 602. The client(s) 602 can be hardware and/or software (e.g., threads, processes, computing devices). The system 600 also includes one or more server(s) 604. The server(s) 604 can also be hardware and/or software (e.g., threads, processes, computing devices). One possible communication between a client 602 and a server 604 may be in the form of a data packet adapted to be transmitted between two or more computer processes. The system 600 includes a communication framework 610 that can be employed to facilitate communications between the client(s) 602 and the server(s) 604. The client(s) 602 are connected to one or more client data store(s) 606 that can be employed to store information local to the client(s) 602. Similarly, the server(s) 604 are connected to one or more server data store(s) 608 that can be employed to store information local to the server(s) 604. In some embodiments, system 600 can instead be a collection of remote computing services constituting a cloud-computing platform.

Figure 7:
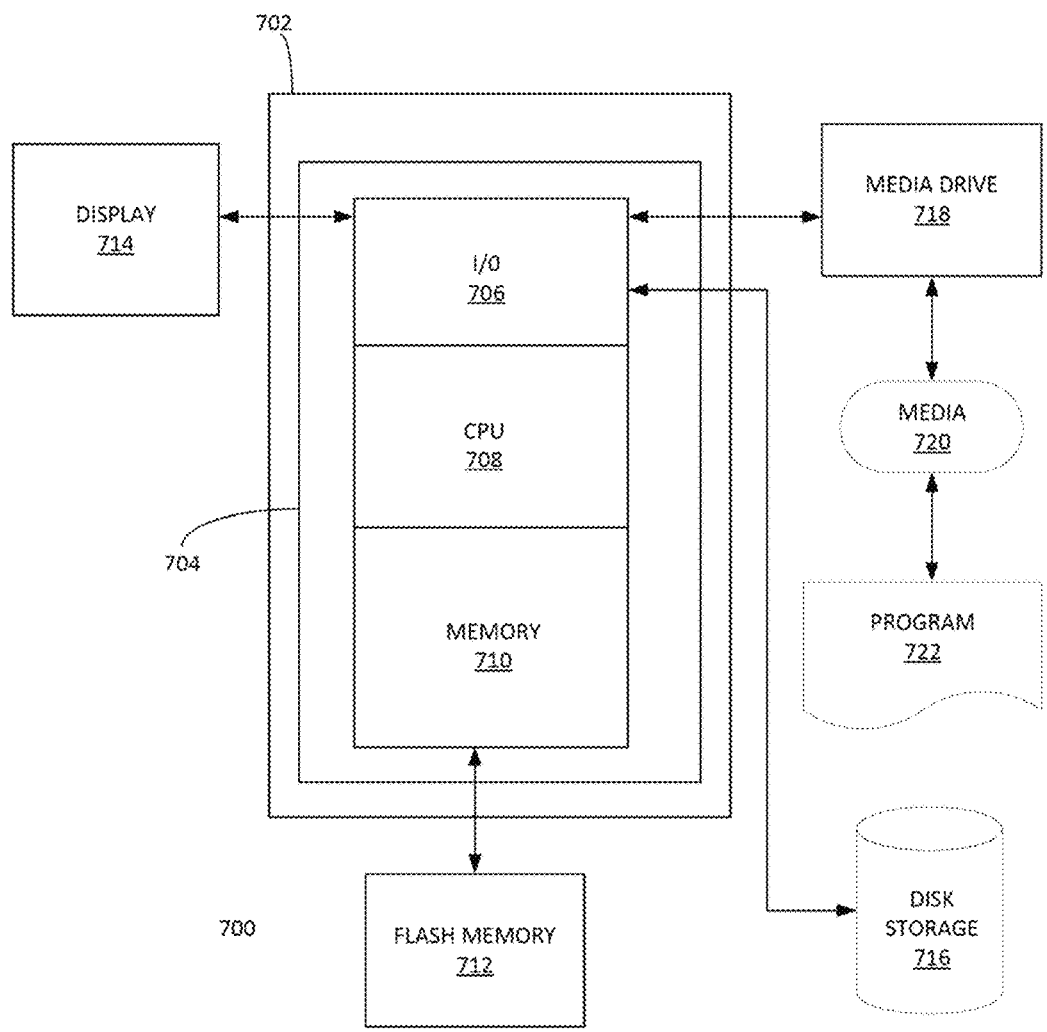
FIG. 7 is a block diagram of a sample-computing environment that can be utilized to implement various embodiments.

FIG. 7 depicts an exemplary computing system 700 that can be configured to perform any one of the processes provided herein. In this context, computing system 700 may include, for example, a processor, memory, storage, and I/O devices (e.g., monitor, keyboard, disk drive, Internet connection, etc.). However, computing system 700 may include circuitry or other specialized hardware for carrying out some or all aspects of the processes. In some operational settings, computing system 700 may be configured as a system that includes one or more units, each of which is configured to carry out some aspects of the processes either in software, hardware, or some combination thereof.

FIG. 7 depicts computing system 700 with a number of components that may be used to perform any of the processes described herein. The main system 702 includes a motherboard 704 having an I/O section 706, one or more central processing units (CPU) 708, and a memory section 710, which may have a flash memory card 712 related to it. The I/O section 706 can be connected to a display 714, a keyboard and/or other user input (not shown), a disk storage unit 716, and a media drive unit 718. The media drive unit 718 can read/write a computer-readable medium 720, which can contain programs 722 and/or data. Computing system 700 can include a web browser. Moreover, it is noted that computing system 700 can be configured to include additional systems in order to fulfill various functionalities. Computing system 700 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Figure 8:
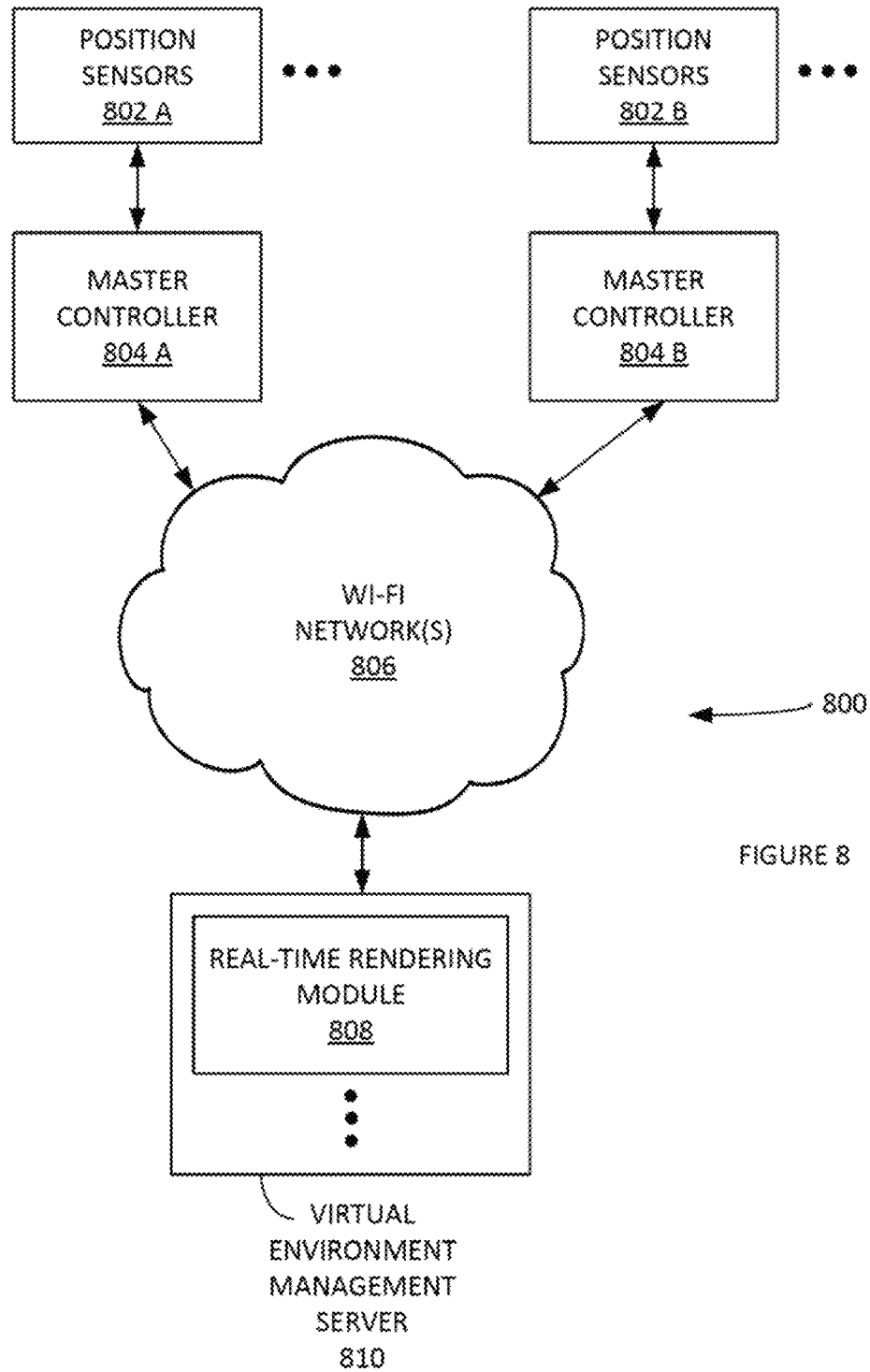
FIG. 8 illustrates an example system utilized to render body-position information as an image in a virtual environment, according to some embodiments.

FIG. 8 illustrates an example interactive system 800 utilized to render body-position information as an image in a virtual environment, according to some embodiments. System 800 can include one or more body-position sensors 802 A-B. Example position sensors are provide in FIGS. 6-8 of U.S. Provisional Application No. 62/260,248, filed on Nov. 25, 2015 which is incorporated herein by reference. System 800 can include one or more master controllers 804 A-B. Master controller 804 A-B can manage body-position sensors 802 A-B. Master controller 804 A-B can obtain body-position information from body-position sensors 802 A-B. Master controller 804 A-B can communicate with other computing devices via Wi-Fi networks 806 (and/or other computer networks such as the Internet, etc.). Master controller 804 A-B can communicate body-position information with virtual environment management server 810. Virtual environment management server 810 can include various functionalities for processing body-position information, generating virtual environments (e.g. VR environments, digital animation, etc.). For example, virtual environment management server 810 can include real-time rendering module 808. Real-time rendering module 808 can render body-position information for presentation in a virtual environment. Additionally, virtual environment management server 810 can include functionalities for receiving user virtual environment instructions. For example, users can design avatars that move in the virtual environment based on the body-position information. Virtual environment management server 810 can include webs servers, API managers, database managers, graphics editors, video editors, audio editors, etc.

Smart-interactive system 800 can implement both one-way communication of motion data to one or more analysis computer systems. Smart-interactive system 800 can further provide a real-time interaction between the analysis computer systems and the user as a react-and-respond interactive system (e.g. two-way communication). These interactions enable the user to receive system feedback in real-time (e.g. assuming processing latency, networking latency, etc.). The feedback can be based on the actual movements (e.g. light-based feedback, sound-based feedback, and vibration-based feedback (e.g. haptics), etc.). In this way, a user can use gestures that are performed as inputs for controlling the various functions of a computing system (e.g. gesture recognition). Moreover, smart-interactive system 800 can provide real-time feedback based on specific gestures. In one example embodiment, a computer system integrated into a body-motion capture suit can recall a series of gestures that the system over time can learn to recognize (e.g. as an artificial intelligence-based functionality, etc.).

Smart-interactive system 800 can enables physical interaction between users and/or a user and an object. Smart-interactive system 800 can include a computing system that combines incoming information from position sensors. In one example, this communication infrastructure can be cables that communicatively couple the positional sensors. These cables can be integrated into the textile of the body suit so as to not be exposed to damage. This configuration also makes interaction between two players/actors and even interaction with the environment more durable. Touch and interaction with real, physical objects or people is possible without affecting the position of the sensors and hereby the overall performance of the system. Two actors can embrace each other in a scene without repositioning or damaging sensors on the body suit. The replacement of parts to the motion-capture body suit can be facilitated with direct access to the electronic components in tunnels in the textile portion which can be accessed via zippers.

Smart-interactive system 800 can implement real-time rendering and motion capture. In one example, a three-dimensional (3D) game environment can be used for rapid animation creation and real-time-streaming/real-time-rendering. Smart-interactive system 800 can be integrated with real-time-rendering game engines (e.g. Unity3D®, Unreal Engine, etc.). Smart-interactive system 800 can enable real-time, interactive motion capture experiences on mobile devices as well.

Smart-interactive system 800 can be utilized as a virtual reality (VR) input device. Smart-interactive system 800 can combine body motion information for display in a VR head-mounted display (HMD). In this way, smart-interactive system 800 can provide a user a 'body' presence in a VR environment. In this way, a user can solve tasks, communicate with body language, and play/interact in game settings with other people.

In some embodiments, smart-interactive system 800 can utilize light-weight data output that enables 4G/LTE streaming of body-motion data. The light-weight of the data also makes it possible to real-time stream the body data via 4G/LTE cell phone infrastructure. A counterpart can then stream and respond to the data real-time at another location via the Internet. Multiple users/players can also stream their data via 4G/LTE networks to a central cloud unit from where a third party can access it and view/respond to it.

The output of smart-interactive system 800 can be directly transferred into a game engine application without middleware interpreting the data to form a body model. The The output of smart-interactive system 800 can be directly connected to a smartphone or tablet possible without other devices and/or middleware.

Example Methods and Use Cases

Figure 9:
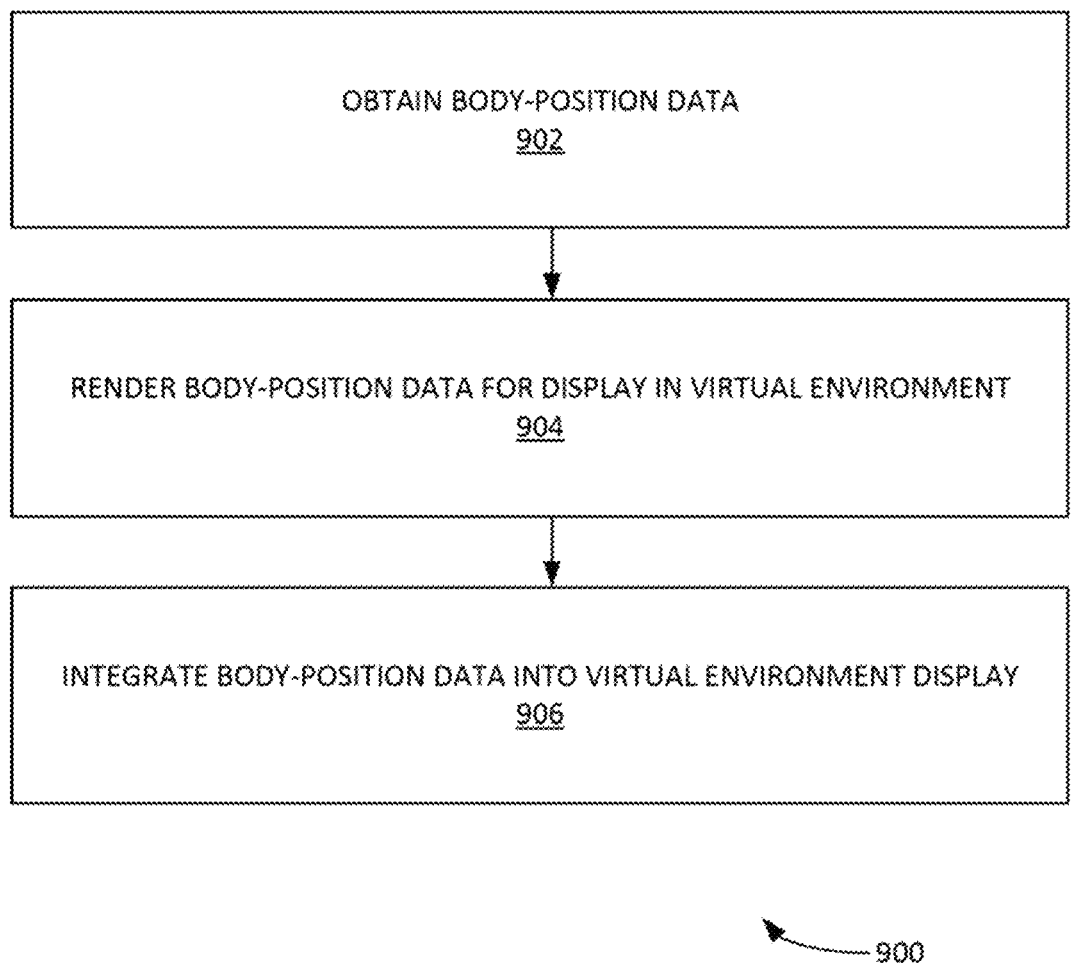
FIG. 9 illustrates an example process of integrating body-position information into a virtual environment in real-time, according to some embodiments.

FIG. 9 illustrates an example process 900 of integrating body-position information into a virtual environment in real time (e.g. assuming various processing and/or networking latencies), according to some embodiments. In step 902 of process 900, user body position data (e.g. motion-capture data, etc.) can be obtained from one or more body-position sensors. For example, the body-position sensors can be integrated into a user-worn clothing (e.g. a motion-capture body suit, etc.). The body-position information can be obtained with the various systems provided supra. In step 904, process 900 can implement various real-time rendering processes. Step 904 can prepare the body-position information for integration into a virtual environment (e.g. a VR display, a computer-generated cartoon, a digital video displayed on a web page, a MMS message video, etc.). Accordingly, in step 906, the rendered body-position information can be integrated into the virtual environment. For example, motion-capture data can be communicated to a computer that renders an animated character in the virtual environment in substantially real time. In some embodiments, process 900 can be utilized in the following, inter alia: a Psychiatric device interface to foster communication with psychologist; motion capture suit as input/controller in computer games; control/input-device/interface for computers in general, consoles, robots, culture/art-installations; animotion (e.g. interactive theater with a motion capture suit); VR movies/environments; sports analysis (e.g. for precise tracking of full body motions, etc.); medical diagnostics; rehabilitation/training (e.g. in telemedicine, etc.); military (e.g. training exercises, drone/robot control, etc.); mining/deep water robot control or simulation for diving training; etc. Process 900 can be utilized to engage persons with autism spectrum disorders (ASD).

Figure 10:
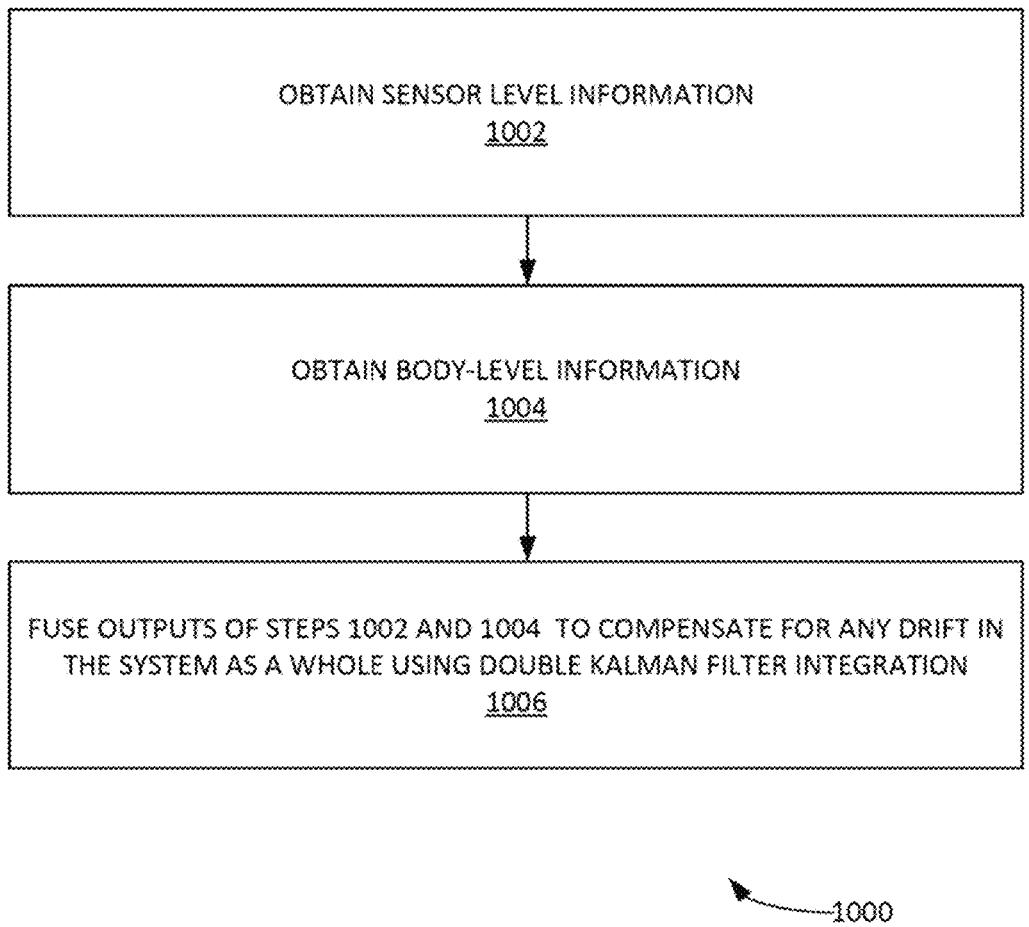
FIG. 10 illustrates an example process of implementing a two-level Kalman filter on motion-capture body suit motion data, according to some embodiments.

FIG. 10 illustrates an example process 1000 of implementing a two-level Kalman filter on motion-capture body suit motion data, according to some embodiments. A Kalman filter can implement Kalman filtering. Kalman filtering (e.g. linear quadratic estimation (LQE)) can be an algorithm that uses a series of measurements observed over time, containing statistical noise and other inaccuracies, and produces estimates of unknown variables that tend to be more precise than those based on a single measurement alone, by using Bayesian inference and estimating a joint probability distribution over the variables for each timeframe. Motion-capture body suit motion/position/inertia/orientation information (i.e. 'position' information) can be obtained two levels. In step 1002, sensor level information can be obtained. In step 1004, body-level information can be obtained. In step 1006, these two levels of information can be fused to compensate for any drift in the system as a whole using double Kalman filter integration.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A method of a motion-capture body suit comprising:
providing a motion-capture body suit, wherein the motion-capture body suit comprises a plurality of position sensors, wherein each position sensor of the plurality of position sensors obtains a position of an associated body area, wherein each position sensor is integrated into a textile tunnel located on the associated body are of each position sensor;
obtaining a set of sensor-level position data from the plurality of position sensors as a series of position measurements observed over a specified period of time;
obtaining a body-level position data as another series of body-position measurements observed over the specified period of time;
combining the set of sensor-level position data and the body-level position, data using a Kalman filter to produce a body-motion output stream;
rendering an image data of a virtual representation of a user wearing the motion-capture suit from the body-motion output stream;
transferring the image data of a virtual representation of a user into a game engine application without a middleware system interpreting the image data; and
using the image data to provide a body presence of the user in a virtual-reality environment.

2. The method of claim 1, wherein the position information comprises a velocity value, an acceleration value, and an orientation value of the associated body area.

3. The method of claim 2, wherein the Kalman filter comprises a double Kalman filter.

4. The method of claim 3, wherein the double Kalman filter implements a Bayesian inference process and estimates a joint probability distribution over the set sensor-level position data and the body-level position data for each timeframe measured in the specified period of time.

5. The method of claim 4, wherein each position sensor of the plurality of position sensors comprises an inertial motion units (IMU) sensor.

6. The method of claim 5, wherein the IMU sensor has nine degrees of freedom (DoF).

7. A method of a motion-capture body suit comprising:
providing a motion-capture body suit, wherein the motion-capture body suit comprises a plurality of position sensors, wherein each position sensor of the plurality of position sensors obtains a position of an associated body area, wherein each position sensor is integrated into a textile tunnel located on the associated body are of each position sensor, wherein the motion-capture body suit automatically repositions a position sensor embedded in a textile tunnel;
obtaining a set of sensor-level position data from the plurality of position sensors as a series of position measurements observed over a specified period of time;
obtaining body-level position data s another series of body-position measurements observed over the specified period of time;
combining the set of sensor-level position data and the body-level position data using a Kalman filter to produce a body-motion output stream;
rendering, an image data of a virtual presentation of a user wearing the motion-capture suit from the body-motion output stream.

8. A method of a motion-capture body suit comprising:
providing a motion-capture body suit, wherein the motion-capture body suit comprises a plurality of position sensors, wherein each position sensor of the plurality of position sensors obtains a position of an associated body area, wherein each position sensor is integrated into a textile tunnel located on the associated body are of each position sensor, wherein the motion-capture body suit automatically repositions a position sensor embedded in a textile tunnel;
obtaining a set of sensor-level position data from the plurality of position sensors as a series of position measurements observed over a specified period of time;
obtaining a body-level position data as another series of body-position measurements observed over the specified period of time;
combining the set of sensor-level position data and the body-level position data using a Kalman filter to produce a body-motion output stream;
rendering an image data of a virtual representation of a user wearing the motion-capture suit from the body-motion output stream; and
transferring the image data of a virtual representation of a user into a game engine application without a middleware system interpreting the image data.

* * * * *